United States Patent [19]

Dickinson

[11] 4,377,066
[45] Mar. 22, 1983

[54] POLLUTION-FREE PRESSURIZED FLUIDIZED BED COMBUSTION UTILIZING A HIGH CONCENTRATION OF WATER VAPOR

[76] Inventor: Norman L. Dickinson, Box 211, Lavallette, N.J. 08735

[21] Appl. No.: 153,440

[22] Filed: May 27, 1980

[51] Int. Cl.³ .............................................. F02C 3/26
[52] U.S. Cl. .................................. 60/39.05; 60/39.464
[58] Field of Search ............ 60/39.05, 39.55, 39.46 S; 431/7, 170; 110/263

[56] References Cited

U.S. PATENT DOCUMENTS

| | | | |
|---|---|---|---|
| 2,672,012 | 3/1954 | Vernon | 60/39.46 S |
| 2,718,754 | 9/1955 | Lewis et al. | 60/39.46 S |
| 3,972,180 | 8/1976 | Van Gelder | 60/39.05 |
| 4,164,846 | 8/1979 | Moskowitz et al. | 60/39.46 S |

FOREIGN PATENT DOCUMENTS

935658  9/1963  United Kingdom ............... 60/39.05

Primary Examiner—Louis J. Casaregola

[57] ABSTRACT

A continuous process for the combustion of solid fuels in a fluidized bed of solid particles under conditions such that flue gas is essentially free of dust and oxides of sulfur and nitrogen. Fuel is charged as an aqueous slurry and additional water condensed from the flue gas is recycled to the combustion zone. Combustion is promoted both by water vapor and alkali added with fuel slurry, while the alkali serves also to neutralize and remove sulfur in completely oxidized, or sulfate, form. Useful heat is recovered from the hot gases leaving the combustion zone and, in some cases, from the fluidized bed itself. Under the pressure of the system recovery of heat results in condensation of water which serves to scrub dust from the flue gas, slurry product ash and furnish recycle water, which controls reaction temperature as well as promoting the combustion.

16 Claims, 8 Drawing Figures

FIG_1

FIG_4

FIG_3

FIG_2

FIG_5

FIG_8

FIG_7

FIG_6

POLLUTION-FREE PRESSURIZED FLUIDIZED BED COMBUSTION UTILIZING A HIGH CONCENTRATION OF WATER VAPOR

BACKGROUND OF THE INVENTION

This invention concerns the utilization of the heating values of carbonaceous fuels for the production of useful thermal, mechanical or electrical energy.

Burning coal to generate steam is one of the oldest of the industrial arts. Numerous inventions have been applied to improving its efficiency and alleviating the coproduction of noxious smoke, which tends to contain unburned fuel, finely powdered ash and oxides of sulfur and nitrogen. Nevertheless, even with the latest technology, coal is considered a dirty fuel, capable only with great difficulty and expense of complying with increasingly stringent air pollution standards.

The high cost of removing sulfur oxides from conventional flue gases has resulted in a spread between the prices of low and high sulfur coals. Moreover, the former are found, for the most part, in western states remote from the areas of greatest energy need. Thus the market price structure provides economic incentive for the commercialization of a process able to produce steam and power from high sulfur coals without air pollution. Other reserves of solid fuels remain largely untapped because of high contents of water or ash.

Combustion of coal in conventional ways creates temperatures well over 2000° F. Conventional apparatus must, therefore, be constructed of expensive materials capable of withstanding such temperatures. Moreover, components of the ash frequently melt or sinter forming deposits which foul parts of the apparatus, causing loss of efficiency, downtime and increased maintenance expense. A further undesirable consequence of the usual temperatures is the inadvertant formation of nitrogen oxides which cannot be effectively and economically removed from flue gas with available technology.

Generation of high pressure steam does not inherently require such high temperatures since the boiling point of water at 2000 pounds per square inch is only about 635° F. and at 3000 pounds per square inch under 700° F.

It has been proposed to burn coal by the indirect means of first converting it to liquid or gaseous fuel, which can be desulfurized before combustion to a clean flue gas. These techniques also employ high temperatures and generally share serious economic and operational drawbacks associated with coal's tendency to cake and stick when heated, the formation of soot or tarry residues and difficulties with erosion and dust control. They are further burdened with low overall thermal efficiencies.

The catalytic effect of common alkalis such as soda ash (sodium carbonate) and limestone (calcium carbonate) on the reactivity of carbonaceous materials is well known and has been utilized in the gasification of coal and coke. Alkaline compounds are used in commercial steam-hydrocarbon reforming catalysts to promote the oxidation of carbon to gaseous products. Conventional combustions do not employ alkaline catalysts because, at the high temperatures, they would volatilize and/or combine with ash ingredients to form troublesome slag or clinker.

Some of the newer fluidized bed combustion processes do, however, use beds containing limestone, or similar alkaline particles, and thus are able to burn the fuel at reduced temperature, avoiding or minimizing nitrogen oxides and slag or clinker. Generally, two categories of fluidized bed combustion processes are recognized in the art: atmospheric pressure and pressurized. While both are considered to have commercial promise, the atmospheric version requires a high excess of alkali to effect even moderately high sulfur removal and both encounter difficulty in separating dust from flue gas. Although pressurized fluidized beds achieve a better alkali utilization, sulfur removal is still incomplete and dust control is even more cruical since energy must be recovered from hot flue gases by expanding them through turbines subject to erosion.

It has been known for more than 70 years that water accelerates the reaction between coal and atmospheric oxygen. Ordinary combustion processes cannot take advantage of this phenomenon because wet fuel must be dried before it will ignite. Moreover, water entering a conventional combustion, as well as the known fluidized bed combustions, leaves the system as vapor, carrying with it as an energy loss its latent heat of evaporation.

The combustion-promoting effect of water is strikingly illustrated by a family of processes, known as Wet Air Oxidation (WAO), which modify or destroy organic matter suspended in water by contact with air at elevated temperature and pressure. While used mainly to purify waste water WAO, which was originally known as the Zimmerman process, has been proposed as a means of desulfurizing coal by partial oxidation and even for recovering energy from such fuels as peat. WAO is liquid phase and therefore confined to temperatures below the critical temperature of water (705.4° F.), which limits reaction rates (requires large, expensive reactors) and the temperature at which useful heat can be delivered. WAO processes do not use alkaline catalysts.

There is a large body of art concerning the physical behavior of fluidized solids in general, as functions of particle size and size range, electrical properties, gas velocity, reactor size, proportions, etc. as well as considerable art concerning various versions of fluidized bed combustion. Much of this art is useful background for the behavior of fluidized beds in the process of my invention when proper allowance is made for the unusually high gas densities and low gas volumes.

It is customary to express the gas velocity in a fluidized bed as though there were no solids present, the so-called "superficial velocity". The most common form of fluidized bed, in which this velocity is usually between 1 and 10 feet per second (fps), is also described as a "dense phase" to distinguish it from a "dilute phase" of gas, carrying a comparatively light loading of solid particles, usually encountered in a settling space, or freeboard, above the dense phase. At relatively low gas velocities and/or with coarse and/or dense particles, there may be a clearly defined interface between dense and dilute phases, rather resembling a liquid level. On the other hand, with high gas velocities and/or fine and/or light particles, the transition may take place over a zone of appreciable depth in which there is a gradient between dense and dilute phase particle loadings.

Following the descriptions of the embodiments will be easier if it is understood that the art of fluidized solids processes generally recognizes two additional gas-solids phase conditions, viz., transport or "entrained phase" and compacted or "settled phase". Compared with dense phase, entrained phase is characterized by high gas velocity and low particle loading. It is found in gas-solids inlet lines and risers or "draft tubes". At the opposite end of the velocity-density spectrum is settled phase, found in drawoff wells, standpipes and hoppers, in which gas velocity is comparatively low and particle loading comparatively high. A high degree of turbulence and mixing is found in an entrained phase, a moderately high degree in a dense phase and a low degree in a settled phase. These phase distinctions are a convenience to the technical writer but there can be intermediate conditions that are not clearly one or the other. For example, characteristics of a so-called dilute phase can approach those of an entrained phase.

Flue gas is nearly always a combustion by-product of zero, or even negative value (considering its unrecovered heat and the expense of meeting emissions regulations). However, in recent years an application of presurized combustion has emerged, in which both flue gas and its pressure energy are valuable products. This application is the enhanced recovery of residual oil from old oilfields.

Carbon dioxide in flue gas under pressure tends to dissolve in crude oils, increasing their fluidity. The pressure and volume of the undissolved gas helps to move the oil toward a producing well. Fluidity can also be increased by heating so, in some cases, steam is injected into the formations to raise their temperature. Later technology combines the benefits of both by injecting flue gas-steam mixtures, generated by combustion of a liquid or gaseous fuel under pressure, followed by quenching of the hot combustion products with water.

At the high temperature of these essentially conventional combustions, nitrogen oxides are formed. In the case of sulfur-containing fuels, sulfur dioxide is produced. These pollutants are removed, to a degree, by adding chemicals to the quench water. Disadvantages of the present art are the high cost of premium fuels, inadequate pollutant control, costs of chemicals and of disposing spent chemicals. There is substantial economic incentive to substitute cheaper solid fuels and to reduce treatment and disposal expense.

SUMMARY OF THE INVENTION

Carbonaceous fuel is ground or pulverized and mixed with alkali, water and/or recycled aqueous solution to form a slurry. The fuel slurry is pumped and preheated by heat exchange and then injected into a fluidized bed of solids. Since the temperature of the bed is higher than the critical temperature of water, slurry water immediately joins the gas phase while fuel particles are dispersed among those comprising the fluidized bed. The bed is maintained in fluidized state by the upward velocity of air and additional water vapor distributed into the lower part of the bed. As air rises through the bed, combustion of fuel particles occurs, oxygen being replaced by carbon dioxide and water vapor. Heat of combustion tends to increase the bed temperature which is limited to the desired level by the injection of water and, in some cases, transfer of heat from the bed to a heat transfer medium (such as boiling water or steam).

Under the relatively low temperatures and high water partial pressures characteristic of my process, sulfur in the fuel oxidizes predominently to sulfuric acid which, being more strongly acidic than the usual dioxide form, combines rapidly and completely with alkali in the bed. In the preferred temperature range formation of nitrogen oxides is negligible.

Above the fluidized bed entrained solid particles settle from the product gases which may be further purified of dust by passing through a cyclone, or other conventional, dust separating device. Hot product gases may be used directly, as for oilfield heating and repressuring, or useful heat may be recovered from the gases, cooling them. At the relatively high pressure and water vapor content, as cooling continues, the dewpoint is reached and water condenses to liquid form. Some of this water may be recycled to the reaction zone and some may be used to slurry ash and spent alkali withdrawn from the fluidized bed, for removal from the system. Hot ash slurry is usually used to preheat incoming fuel slurry after which ash is separated for disposal and the aqueous portion recycled, in part, to the fuel slurrying system, the remainder being removed from the apparatus as a purge of soluble salts.

Spent solids may also be removed from the system in dry form, in which case hot water condensed in excess of fluidized bed cooling requirements, usually carrying a light loading of dust particles, preheats the fuel slurry before being divided between fuel slurrying and purge.

Flue gases separated from the condensed water, still carrying considerable water vapor, may be further cooled, dried and freed from dust by scrubbing with a circulating stream of hot water. Heat so transferred to the circulating water is utilized, for example, to reheat flue gas and preheat boiler feedwater.

Reheated flue gas, which may be further heated by exchange with hot product gases, may be delivered as a product or expanded through turbines which drive the air compressors. Useful heat recovery from hot product gases is usually in the form of generating and superheating steam although some may be used to heat flue gas to a temperature such that the turbines yield a surplus of power above that needed for the compressors.

An object of the invention is to provide a practical and economical means of obtaining heat and power from coal, and other carbonaceous fuels, without polluting the atmosphere. Antoher object is to make it economically possible to utilize reserves of fuels with high contents of sulfur, ash, water or other contaminents, which are poorly suited to conventional combustion methods. A further object is to provide a means of limiting the maximum temperature in a combustion process without the loss of thermal efficiency.

DESCRIPTION OF PREFERRED EMBODIMENTS

Figure 1:
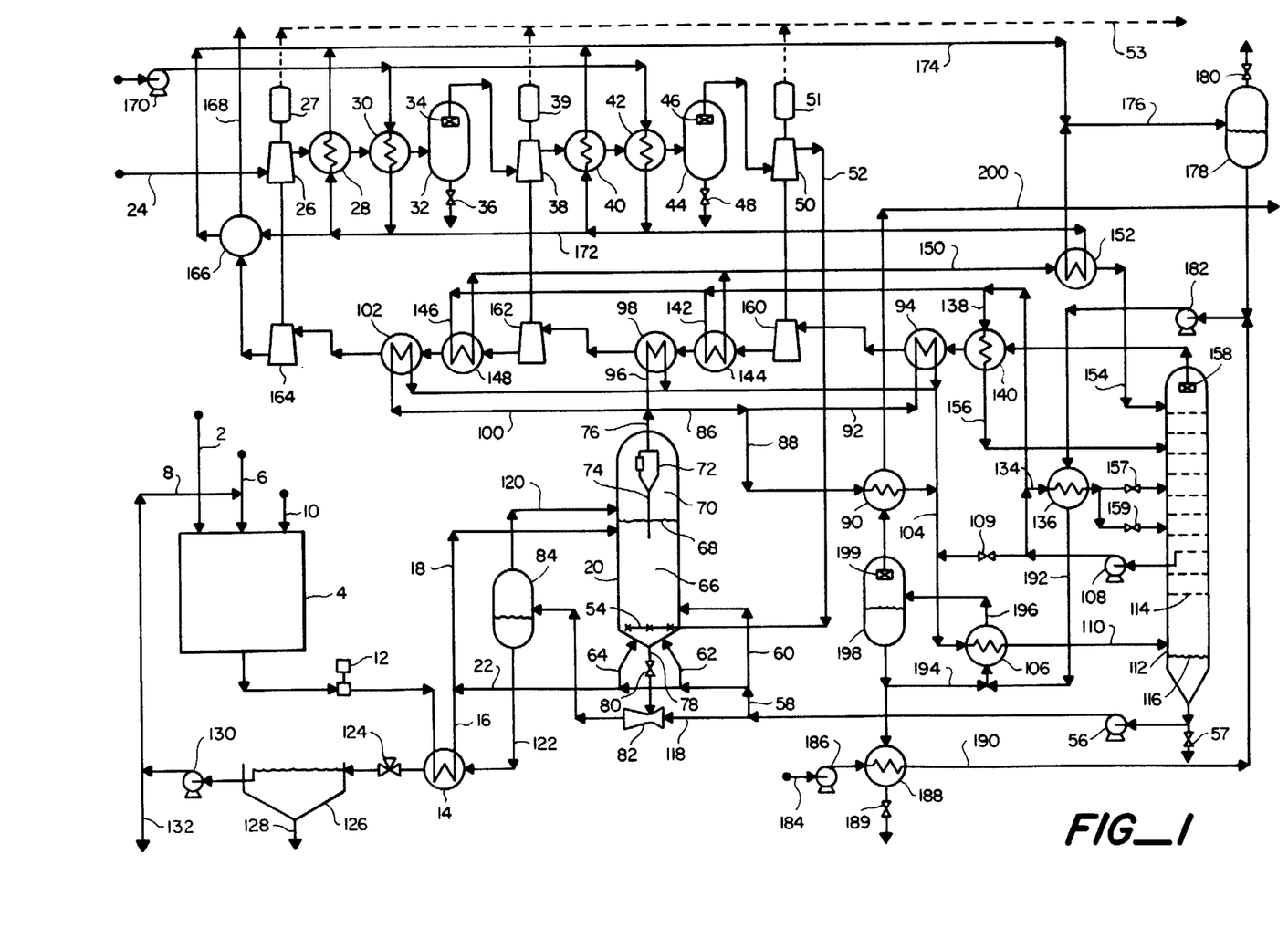
FIG. 1 is a schematic elevational diagram illustrating an embodiment of the process of the invention employing a downflow fluidized bed reactor.

With reference to FIG. 1, crushed coal from a suitable source is supplied through a conduit 2 to a conventional grinding and slurrying system 4 in which it is mixed with water coming from a suitable storage facility through a line 6 and recycled solution entering by means of a line 8. Powdered, granular, dissolved or slurried alkali is added to the mixture via a conduit 10. A coal slurry charge pump 12 draws the resulting slurry from the system 4 and provides sufficient pressure to cause it to flow through a preheat exchanger 14 and lines 16 and 18 to a fluidized bed reactor 20. The coal slurry in the line 16 may be joined by recycled fines slurry from a line 22, the combined stream comprising the slurry charge to the reactor 20. Although, for convenience, the slurry charge is shown entering the reactor 20 at a single point, in practice multiple points of injection may be employed.

Atmospheric air is filtered in a conventional manner (not shown) to protect the equipment from airborne solids and conducted via a conduit 24 to the suction of a first-stage air compressor 26 which delivers it hot and at an elevated pressure level of a first section of first-stage air-condensate exchanger 28 from which, partially cooled, it flows to a second section of first-stage air-condensate exchanger 30. The cooling medium in the exchangers 28 and 30 is vacuum steam condensate which flows first through the exchanger 30 and then the exchanger 28, counter-current to the flow of compressed air.

Atmospheric air contains a variable amount of water vapor (humidity). Most of the water vapor contained in the air drawn into the apparatus condenses to liquid water during the final cooling of first-stage compressed air in the exchanger 30. This water is separated in a second-stage air compressor suction drum 32 and a mist extractor 34 and discharged from the apparatus through a control valve 36.

The dried first-stage compressed air flows from the mist extractor 34 to the suction of a second-stage air compressor 38 which delivers it hot and at a further increased pressure level to a first section of second-stage air-condensate exchanger 40 from which, partially cooled, it flows to a second section of second-stage air-condensate exchanger 42. The exchangers 40 and 42 operate in parallel with the exchangers 28 and 30 with respect to the vacuum steam condensate cooling medium. A small amount of liquid water condenses also in the exchanger 42 and is separated from the air in a third-stage air compressor suction drum 44 and a mist extractor 46 and discharged from the apparatus through a control valve 48.

The dried second-stage compressed air flows from the mist extractor 46 to the suction of a third-stage air compressor 50 which delivers it hot and slightly above reaction pressure to a line 52 which supplies combustion air to the fluidized bed reactor 20 through an air distributor 54.

Also injected into the lower part of the reactor 20 is a quantity of recycled hot water containing a low concentration of fine solid particles in suspension, coming from the discharge of a fines slurry recycle pump 56 by way of a line 58. This recycled water enters at one or more points above the air distributor 54, as diagrammed by a connection 60, and may also enter at one or more points below the air distributor 54, as illustrated by connections 62 and 64. These connections may be in the form of nozzles extending through the shell of the reactor 20 some distance into a dense phase bed of fluidized particles 66 occupying the lower portion of the vessel.

An alternative source of water recycle is a circulating reflux pump 108 which is able to supply the reactor 20 with hot water essentially free of suspended solids through connections not shown.

The dense phase bed of solid particles 66 is maintained in suspension and constant motion by an upward flow of gas, an interface 68 separating the dense phase 66 from a dilute phase 70 occupying the upper portion of the reactor 20. Larger and heavier particles tend to remain in the dense phase 66 while smaller and lighter particles tend to be carried upward by the gas rising into the dilute phase 70.

Product gases containing entrained particles which did not settle out while passing through the dilute phase zone 70, enter a cyclone separator 72 in which centrifugal forces cause a major part of the weight of entrained solid matter to be separated and returned, by gravity, to the dense phase 66 through a dipleg 74. A small amount of very fine powder (fines) remains in the product gases leaving the cyclone separator through an outlet connection 76.

Figure 5:
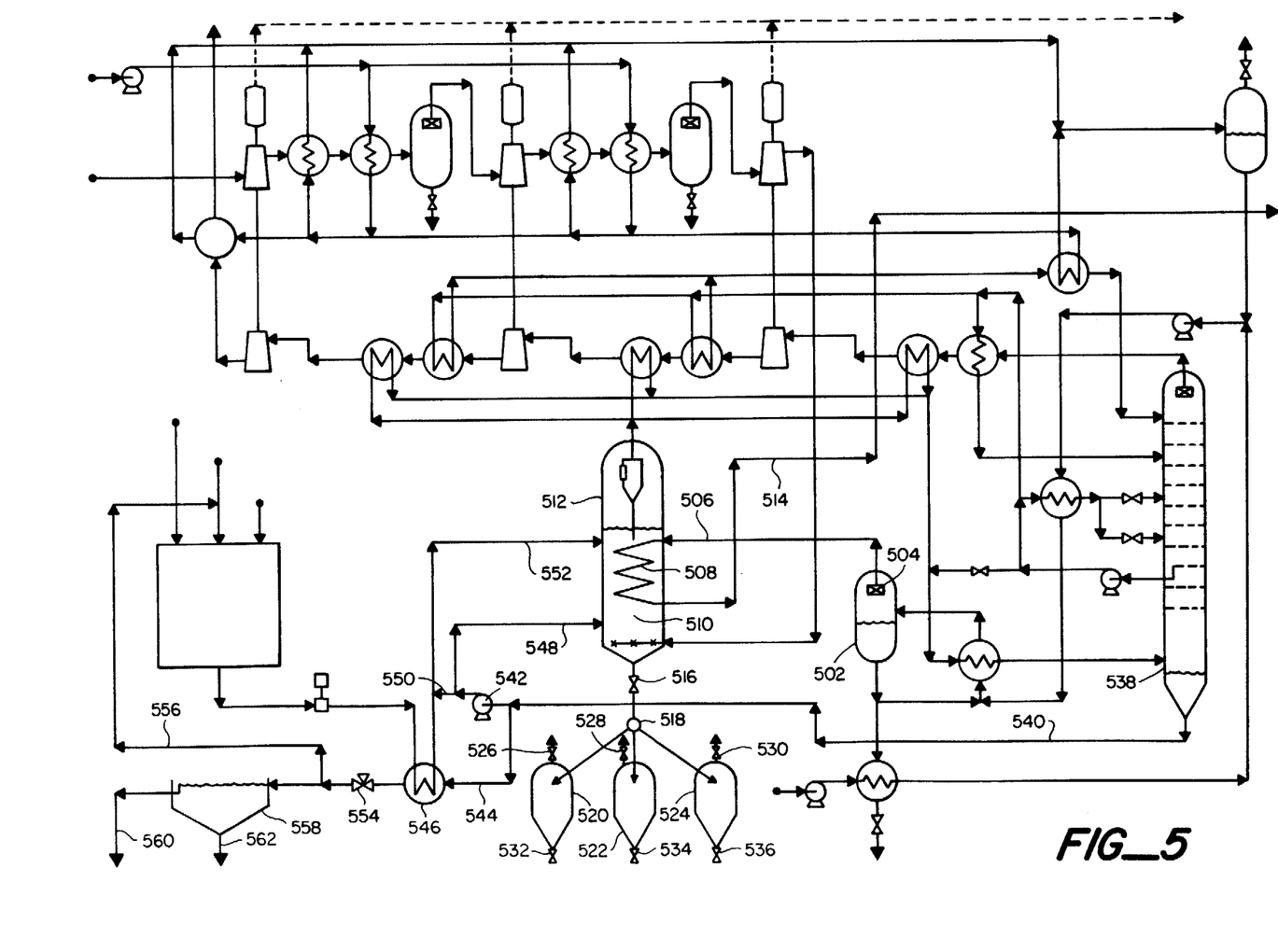
FIG. 5 is a schematic elevational diagram illustrating an embodiment of the process of the invention in which a downflow fluidized bed is cooled by indirect heat exchange and spent solids are removed in dry form.

In order to prevent an increase in inventory of solid particles in the fluidized bed reactor 20, which would cause the interface 68 to rise above the desired level, a continuous withdrawal of settled solids is made through a standpipe 78, under control of a powder control device 80. The withdrawn solids, comprising product ash and spent alkali, are mixed with fines slurry in a mixing device 82, thereafter flowing as ash slurry to a slurry de-aerator drum 84. (Alternatively, a dry solids removal system, as illustrated in FIG. 5, may be used with the process of FIG. 1.)

Product gases from the outlet connection 76 divide into four parallel streams flowing to serve as heating medium, respectively, through a line 86 and a line 88 to a steam superheat exchanger 90, through the line 86 and a line 92 to a first-stage flue gas reheat exchanger 94, through a line 96 to a second-stage flue gas reheat exchanger 98 and through a line 100 to a third-stage flue gas reheat exchanger 102. After giving up some of its sensible heat in the exchangers 90, 94, 98 and 102, the partially cooled product gas streams recombine in a line 104 and flow to a boiler 106 in which more of their sensible heat and the latent heat of part of their water vapor content is transferred to boiling feedwater.

A connection is shown between the discharge of the circulating reflux pump 108 and the line 104, containing a valve 109 to permit intermittent or continuous flushing of any mud-like deposits with clean hot water. While, for convenience of illustration, the flushing water is shown joining the product gases at the inlet of the boiler 106 it may, in practice, join at a point part way through the boiler 106, nearer to the dewpoint location.

The portion of product gases remaining uncondensed after passage through the boiler 106, to which I shall refer as wet flue gas, together with the condensed water, fines and any flushing water, flows via a line 110 to a flue gas dehydrator 112, a cylindrical vessel containing an open separating zone in its lower section and a series of vapor-liquid contacting elements 114, such as bubble or perforated trays, in its upper section.

In the lower, or separating, section of the flue gas dehydrator 112 gravity causes the water containing fine solid particles, or fines slurry, to separate and collect in the bottom forming, along with water flowing downward from the lowest of the contacting elements 114, a fines slurry level 116. The fines slurry recycle pump 56 takes suction from the bottom of the flue gas dehydrator 112, delivering recycled slurry (internal recycle) to the dense phase bed 66, as previously described. Some of the recycled slurry may also flow through the line 22 to dilute the fuel slurry in the line 16. The pump 56 also controls the fines slurry level 116 within the desired range by delivering the net excess of water in the system through a line 118 and the eductor 82 and thence to the ash slurry de-aerator drum 84. In case it is desired to minimize the volume of ash slurry, excess fines slurry may be withdrawn through a valve 57 in which case it, also, would be subject to heat recovery as in a fuel slurry exchanger (not shown) in parallel with the exchanger 14.

Under the influence of gravity, gas bubbles disengage from the liquid ash slurry and form a continuous gaseous phase in the upper part of the drum 84 and are vented through a line 120 to the reactor 20, where they may enter either above the interface 68, as shown, or, if deemed a significant loss of oxygen, through a suitable non-return connection below the interface 68.

Ash slurry, from which gas bubbles have been largely disengaged, leaves the ash slurry de-aerator drum 84 via a line 122 which conducts it to the preheat exchanger 14 in which, as previously described, it gives up sensible heat to coal slurry from the discharge of the coal slurry charge pump 12. A pressure reducing valve 124 then lowers the slurry pressure to essentially atmospheric. Because of the severity of the service imposed upon the valve 124 by the large pressure differential across it, and the abrasiveness of the slurry, its duty may, in practice, be shared by two or more such valves in series, a combination of valves and orifices or venturis or other suitable throttling device.

The cooled and depressured ash slurry enters a settler 126 in which gravity causes the solid particles to concentrate in a conical bottom section, from which they are withdrawn for disposal through a line 128. The liquid portion in the upper part of the ash settler 126, from which most of the solid particles have been separated, flows to a solution pump 130 which causes it to flow to a point of division between a portion, known as external recycle, which returns to the grinding and slurrying system 4 through the line 8, and a portion which is purged from the apparatus via a line 132.

Referring again to the flue gas dehydrator 112, the wet flue gas which entered via the line 110 flows upward through a rectification zone, comprising the vapor-liquid contacting elements 114, counter-current to a descending cascade of water circulated by the circulating reflux pump 108.

The pump 108 takes suction from a sump located in the lower part of the rectification zone, a few trays above the lowermost of the contacting elements 114, and delivers hot water, approaching in temperature the wet flue gas rising from the separating section, through a line 134 to a circulating reflux-boiler feedwater exchanger 136. The pumped circulating reflux is also supplied through a line 138 to a first-stage circulating reflux-flue gas exchanger 140, through a line 142 to a second-stage circulating reflux-flue gas exchanger 144 and through a line 146 to a third-stage circulating reflux-flue gas exchanger 148.

Having been partially cooled by giving up heat to flue gas in the exchangers 144 and 148, circulating reflux flows via a line 150 to a circulating reflux-condensate exchanger 152, in which transfer of heat to partially heated vacuum steam condensate cools it to a temperature suitable to be returned via a line 154 to the uppermost of the contacting elements 114 in the flue gas dehydrator 112.

Circulating reflux which has been cooled by first-stage flue gas in the exchanger 140 is returned via a line 156 to a contacting element near the top of the rectification zone in the flue gas dehydrator 112. Circulating reflux which has been cooled by boiler feedwater in the exchanger 136 is returned to an intermediate point in the rectification zone of the flue gas dehydrator 112, as illustrated by alternative connections controlled by valves 157 and 159.

The cooled circulating reflux returned to the rectification zone is capable, in turn, of cooling the flue gas flowing upward through the zone and condensing from it the major part of the water vapor it contained when separated from the ash slurry. The water so condensed flows downward from the lowest contacting element to join, as previously described, the ash slurry in the bottom of the flue gas dehydrator 112. While flowing through the lowermost of the contacting elements 114 this water serves to wash the rising wet flue gas free of entrained slurry or dust.

The cooled flue gas leaving the uppermost contacting element passes through a mist extractor 158 to free it of entrained water droplets and is then reheated, successively, in the first-stage circulating reflux-flue gas exchanger 140 and the first-stage flue gas reheat exchanger 94. The reheated flue gas is then expanded through a first-stage flue gas turbine 160 which delivers mechanical energy, in the form of shaft horsepower, to the third-stage air compressor 50. Having been cooled by giving up energy in the turbine 160 the flue gas, now at a reduced pressure level, is reheated, successively, in the second-stage circulating reflux-flue gas exchanger 144 and the second-stage flue gas reheat exchanger 98.

Reheated flue gas leaving the exchanger 98 is then expanded a second time through a second-stage flue gas turbine 162 which delivers mechanical energy to the second-stage air compressor 38. Having been again cooled by giving up energy in the turbine 162 the flue gas, now at a further reduced pressure level, is reheated, successively, in the third-stage circulating reflux-flue gas exchanger 148 and the third-stage flue gas reheat exchanger 102.

Reheated flue gas leaving the exchanger 102 is then expanded a third time through a third-stage flue gas turbine 164 which delivers mechanical energy to the first-stage air compressor 26. The expanded flue gas, partially cooled by having given up energy in the turbine 164 and now at a pressure only slightly above atmospheric, flows through an economizer exchanger 166 before being released through a suitable vent 168 to the atmosphere.

A condensate pump 170 takes suction from conventional vacuum steam condensers or a condensate accumulator external to the apparatus and delivers condensate to the second section of the first-stage air-condensate exchanger 30 and to the second section of the second-stage air-condensate exchanger 42. Extracting heat from compressed air in these exchangers increases the temperature of the parallel condensate streams, which recombine in a header 172 from which the warm condensate divides into four streams: one flowing to the first section of the first-stage air-condensate exchanger 28, one to the first section of the second-stage air-condensate exchanger 40, one to the circulating reflux-condensate exchanger 152 and one to the economizer exchanger 166. Transfer of heat from compressed air, circulating reflux and flue gas, respectively, in these exchangers further increases the temperature of the condensate streams, which recombine in a header 174 to flow via a line 176 to a boiler feedwater accumulator 178. The accumulator 178, which may, in practice, be a so-called feedwater de-aerator of proprietary design, permits the separation of any gases which are liberated by the heating of the condensate, allowing them to be vented through a valve 180. From the accumulator 178 condensate flows to the suction of a boiler feedwater pump 182.

Treated boiler make-up water is drawn from offsite through a line 184 by a boiler make-up water pump 186 and preheated by exchange with hot blowdown water leaving the apparatus in a blowdown make-up water exchanger 188. The preheated make-up water flows through a line 190 to join the preheated condensate at the suction of the boiler feedwater pump 182, or (more properly) in the accumulator 178. The combined boiler feedwater stream is given enough pressure by the pump 182 to cause it to flow through the circulating reflux-boiler feedwater exchanger 136, in which it receives its final preheating, and through a line 192 to the inlet of the boiler 106.

Preheated boiler feedwater from the line 192 joins with recirculated feedwater from a line 194, the combined stream comprising the cold side input to the boiler 106. Heat transferred from product gases in the boiler 106 converts part of the entering water to steam, the two phase water-steam mixture flowing via a line 196 to a steam drum 198. The difference in density between the water-steam mixture in the line 196 and the water in the line 194 sets up a hydraulic driving force which causes feedwater to circulate from the bottom of the drum 198 through the boiler 106 and back to the drum 198. In the drum 198 steam separates from feedwater and leaves through a mist extractor 199, which purifies it of entrained droplets on its way to the steam superheat exchanger 90 in which, as previously described, it is superheated by transfer of heat from product gases before leaving the apparatus via a line 200 as a main product of the process.

Dissolved solids brought into the apparatus with the condensate and in the make-up water tend to accumulate in the water in the steam drum 198 and have to be purged from the apparatus through the blowdown-make-up water exchanger 188 under control of a blowdown valve 189. The blowdown water may be discarded but, in some cases, is suitable for coal slurry water, replacing part of that entering the apparatus through the line 6.

In the embodiment of FIG. 1 the flue gas is heated in the flue gas reheat exchangers 94, 98 and 102 to a temperature sufficiently high that the corresponding flue gas turbines, 160, 162 and 164, yield more mechanical energy than consumed by the air compressors, 50, 38 and 26, to which they are connected. The surplus energy of the turbine 160 is, therefore, absorbed in an electric generator 51. Similarly, the surplus energy of the turbine 162 is absorbed in a generator 39 and the surplus energy of the turbine 164 in a generator 27. The electricity generated in the generators 51, 39 and 27 is delivered from the apparatus as a product of the process through a conduit 53. In practice, the generators may be driven by turbines separate from, and in parallel with, those driving the air compressors, but the principle is the same.

The fluidized bed reactor diagrammed in FIG. 1 is of a type which may be described as "downflow". In other words, fuel slurry enters the upper part of a dense phase bed and, although extensive mixing occurs within the bed, the net direction of solids flow is downward, ash and spent alkali being withdrawn from a bottom connection. The net direction of gas and vapor flow, on the other hand, is upward, counter-current to the net solids flow.

Figure 2:
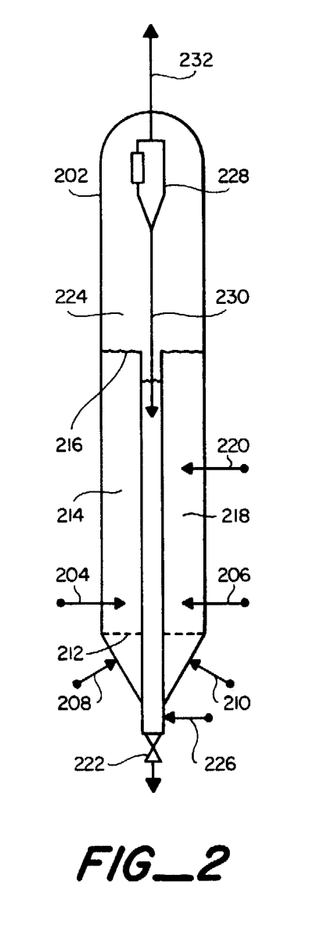
FIG. 2 is a schematic elevational diagram of an upflow fluidized bed reactor suitable for the process embodied in FIG. 1.
Figure 3:
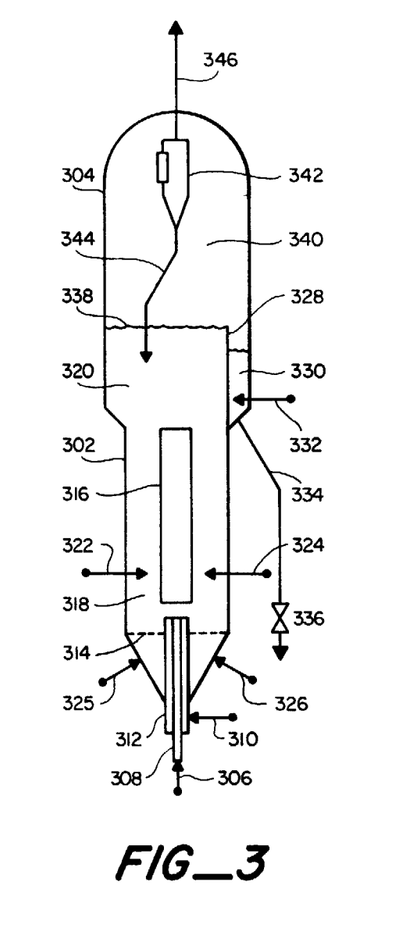
FIG. 3 is a schematic elevational diagram of an alternative upflow fluidized bed reactor suitable for the process embodied in FIG. 1.
Figure 4:
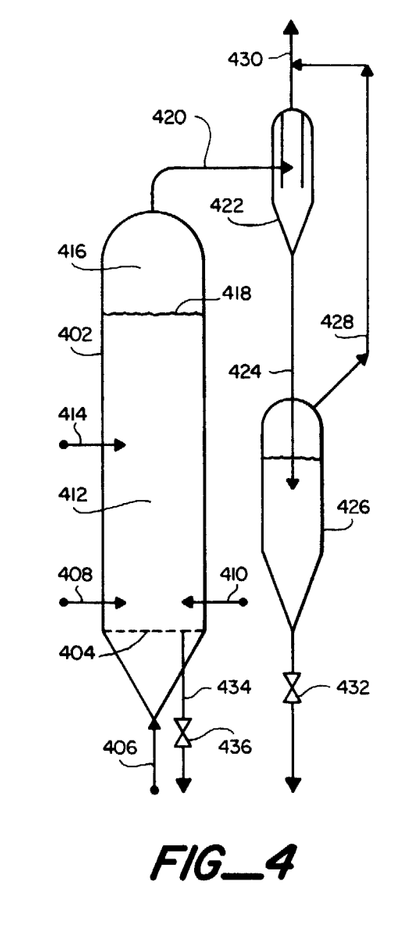
FIG. 4 is a schematic elevational diagram of a further alternative upflow fluidized bed reactor suitable for the process embodied in FIG. 1.

Several other types of fluidized solids reactors can be used with the process of FIG. 1. The reactors diagrammed in FIGS. 2, 3 and 4 illustrate different versions of the "upflow" principle, in which fuel slurry enters the lower part of a fluidized bed and the net flow of solid particles is upward. The net direction of gas and vapor flow is also upward, co-current to the net solids flow.

FIG. 2 illustrates a simple form of upflow fluidized bed reactor in which the net excess of fluidized solids, over the desired inventory, overflows into a centrally located well or standpipe. Fuel slurry, which may be diluted with recycled fines slurry, is injected into the lower part of a reactor vessel 202 at a number of points illustrated by connections 204 and 206. Air is introduced into the bottom head, or cone, of the reactor 202 at one or more points illustrated by connections 208 and 210, located beneath an air distribution grid 212. A dense phase fluidized bed 214, mainly of ash and spent alkali particles, occupies the lower portion of the reactor 202 from the grid 212 to an interface 216 whose position is determined by the height of a central well, or standpipe, 218. Additional recycle water of fines slurry may be injected into the dense phase 214 at an intermediate level, or levels, illustrated by a connection 220. Spent solids overflowing into the standpipe 218 move downwards and leave the reactor under control of a powder control device 222.

Although the fluidized solids in the bed 214 are referred to as a dense phase they are aerated and expanded by the gas and vapor passing through them and are, therefore, less dense then they would have been in the absence of aeration. After entering the standpipe 218 part of the gas which accompanied the solid particles disengages and flows back up the standpipe to join a dilute phase 224 above the interface 216, which consists predominently of product gases with a comparatively light loading of fine solid particles. To assist in stripping fixed gases from the settled solids leaving the reactor a small amount of hot water or fines slurry may be injected into the lower part of the standpipe as illustrated by a connection 226. (If, on the other hand, solids are to be removed from the apparatus in dry form, air or flue gas may be injected through the connection 226.)

A cyclone separator 228, a dipleg 230 and an outlet connection 232 perform the same functions as the corresponding items of FIG. 1.

FIG. 3 illustrates a recirculating type of upflow fluidized bed reactor incorporating a riser, or draft tube, to induce positive top-to-bottom mixing within the fluidized bed. The outer pressure shell consists of a lower cylindrical section 302 and an upper cylindrical section 304 of increased diameter. Fuel slurry, which may be diluted with recycled fines slurry, is charged via a connection 306 into a vertical feed nozzle 308 extending through the bottom head, or cone, at the centerline of the cylindrical shells 302 and 304. Air enters through a connection 310 into an air nozzle 312 surrounding and concentric with the feed nozzle 308. The nozzles 308 and 312 extend through an air distribution grid 314 located at the bottom of the lower cylindrical shell 302.

Slurry from the feed nozzle 308 and air from the air nozzle 312 are projected upward at moderately high velocity into the open lower end of a riser 316. Hot fluidized solids flow downwards in settled phase through an annular space 318 between the riser 316 and the lower cylindrical shell 302 and mix with air and feed slurry immediately below and at the entrance of the riser 316. The heat content of the solids so circulated raises the temperature of the resulting mixture above the critical temperature of the slurry water which, therefore, immediately ceases to be in liquid phase. The mixture flows upward as an entrained phase through the riser 316. Under the conditions of turbulent mixing, comparatively high concentrations of fuel and oxygen, combustion proceeds at a rapid rate during passage through the riser 316.

Leaving the top of the riser 316 the mixture enters a dense phase zone of substantially reduced gas velocity 320 located in the lower part of the upper cylindrical shell 304, which provides time for the combustion to continue and for product gases, now substantially depleted of oxygen, to be disengaged from the bulk of the fluidized solids. The larger proportion of solids entering the reduced velocity zone 320 eventually settle and flow downward through the annular space 318, where they meet with and vaporize recycled water or fines slurry injected through nozzles illustrated by connections 322 and 324, before being recirculated back up the riser 316 as previously described. To insure that the settled solids in the annular space 318 remain in free-flowing condition a small upward velocity is maintained through the air distribution grid 314 by supplying air through connections 325 and 326.

Dense phase corresponding to the net production of ash and spent alkali overflows a weir 328 into a drawoff well 330 in which further disengagement of gaseous phase takes place. The settled spent solids may be cooled and further freed of fixed gases by the injection of a small amount of hot water or fines slurry through a nozzle 332 before being drawn off through a standpipe 334 under control of a powder control device 336. (If, on the other hand, solids are to be removed from the apparatus in dry form, air or flue gas may be injected through the nozzle 332.)

As product gases flow upward through an interface 338 between the dense phase in the zone 320 and a dilute phase 340, larger and heavier particles remain with the dense phase while smaller and lighter particles are carried upward into the dilute phase 340. A cyclone separator 342, a dipleg 344 and an outlet connection 346 perform the same functions as the corresponding items of FIG. 1.

FIG. 4 illustrates another form of upflow fluidized bed reactor suitable for the process of FIG. 1. Its distinguishing feature is that the net production of ash and spent alkali is not drawn off from a dense phase bed but is entrained overhead of the reactor with the product gases, being separated from them by a cyclone separator which handles essentially all of the product solids instead of only recycled dust.

A simple cylindrical shell 402 contains an air distribution grid 404 at the bottom and provision for charging air under the grid 404 through a connection 406. Fuel slurry, which may be diluted with recycled water or fines slurry, is injected above the grid 404 through nozzles illustrated by connections 408 and 410. Additional recycled water or fines slurry may be injected through nozzles suitably located in a dense phase bed 412 as illustrated by a connection 414. Most of the reactor space is occupied by the dense phase 412 although a dilute phase 416 will usually exist in the upper part of the reactor 402. The location of an interface 418 between the dense phase 412 and the dilute phase 416 is variable and depends upon operating parameters such as particle size and density and gas velocity.

In practice, the interface 418 seeks a level such that the rate of entrainment of solid particles in the product gases exiting through a reactor overhead line 420 approximately equals the net production of product solids in the system. A cyclone separator 422 separates out the preponderance of the solid material, which falls through a dipleg 424 into a spent solids hopper 426. In the hopper 426 some of the occluded gases disengage from entering solids and are vented through a line 428 to join with the main stream of product gases in an outlet connection 430.

Settled solids, somewhat compacted by the separation of vented gas, are withdrawn from the reaction system, either continuously or intermittently, through a powder control device 432.

In the event there is an accumulation of particles too heavy to be entrained from the dense phase 412, it is possible to withdraw a small slipstream of fluidized solids from the lower part of the dense phase 412 through a purge standpipe 434 and a purge powder control device 436.

FIG. 5 illustrates an embodiment of the process of the invention in which useful heat is transferred in a heat exchanger immersed in a dense phase fluidized bed to a heat transfer medium, in this case steam being superheated, and in which a dry method is employed for disposing of ash and spent alkali. This embodiment is similar to that of FIG. 1 except that the steam superheat exchanger, heated by product gases and external to the reactor, is replaced by a fluidized bed-steam superheat exchanger within the reactor, and the ash slurrying system is replaced by lock hoppers.

Steam, separated from recirculated boiler feedwater in a steam drum 502 and dried by passing through a mist extractor 504, flows via a line 506 to a fluidized bed-steam superheat exchanger 508 immersed in a dense phase fluidized bed 510 of a combustion reactor 512. In the exchanger 508 some of the heat of combustion liberated in the dense phase 510 is transferred to the steam, raising its temperature to a level suitable for delivery through a line 514 to steam utilizing equipment external to the apparatus.

In order to prevent an increase in inventory of solid particles in the fluidized bed 510, a continuous or intermittent withdrawal of settled solids is made through a powder control device 516. The withdrawn solids, comprising ash and spent alkali, are directed by a diverting device 518 to one of three parallel lock hoppers 520, 522 and 524 which alternatively fill, disconnect, depressure, empty, repressure and reconnect.

When the lock hopper 520 has been filled with spent solids, the diverting device 518 is switched toward the lock hopper 522 and a gas device 526 is opened to bleed gas, which had been maintaining the pressure approximately equal to that in the reactor 512, to a suitable destination. When the pressure in the hopper 520 has been reduced to near atmospheric, the valve 526 is closed and a powder emptying valve 532 opened so that the contents of the hopper 520 may discharge into a bin, conveyor or other heat recovery or disposal means not shown.

When emptying of the hopper 520 is completed the device 532 is closed and the valve 526 opened to a source of gas for repressuring the hopper 520. When the pressure approximately equals that of the reactor 512, the valve 526 is closed and the hopper 520 is ready to take another turn at receiving spent solids. In their turn, the hoppers 522 and 524 undergo similar cycles, utilizing gas valves 528 and 530 and emptying devices 534 and 536, respectively.

The art describes the construction and operation of lock hopper systems, which are not of my invention, in adequate detail, including means of conserving gas from hoppers being depressurized. In brief, gas vented from the hopper 520 may be used to repressure the hopper 524 up to the point of equalized pressure. Then, gas vented from the hopper 522 may be used to raise the pressure of the hopper 524 to a higher equalized pressure and pressurization completed with air from the final stage of the air compression train or with high pressure flue gas. During the filling of a lock hopper it may be necessary to vent excess gas through the appropriate gas valve, for example to the space above the dense phase bed.

The use of three parallel lock hoppers is illustrative only and, in practice, more or less than three may be specified. Furthermore, other methods known to the art for withdrawing powdered solids from pressurized systems may be used in place of lock hoppers.

Similarly as in the embodiment of FIG. 1, fines slurry collects in the bottom of a flue gas dehydrator 538 from which it flows through a line 540 to a point of division between that portion which is recycled to the reactor by a fines slurry recycle pump 542, and the net production which flows via a line 544 to a fines slurry-fuel slurry heat exchanger 546.

The fines slurry recycle enters the fluidized bed 510 at one or more points above the air distributor as diagrammed by a connection 548. This connection, or connections, may be in the form of nozzles extending some distance into the fluidized bed 510. Some of the slurry recycle may be diverted through a line 550 to dilute the fuel slurry being charged to the fluidized bed 510 through a line 552.

After transferring heat to fuel slurry in the exchanger 546, the cooled fines slurry is let down to essentially atmospheric pressure by means of a pressure control valve 554. Because of the severity of the service imposed upon the valve 554 by the large pressure differential across it, and the abrasiveness of the slurry, its duty may, in practice, be shared by two or more such valves in series, or a combination of valves and orifices or venturis. The cooled and depressured slurry is then divided between a portion which is recycled through a line 556 to the fuel grinding and slurrying system (external recycle) and an excess or purge which is clarified in a settler 558 before leaving the apparatus through a line 560. Fines settled in the settler 558 leave the apparatus through a conduit 562.

All other items of equipment illustrated in FIG. 5 perform functions equivalent to the corresponding items of FIG. 1. However, assuming the same fuel and combustion temperature and pressure, the embodiment of FIG. 5 requires less internal recycle water or fines slurry and, therefore, quantitative duties of pumps and heat exchangers in the internal recycle circuit are changed somewhat.

Figure 6:
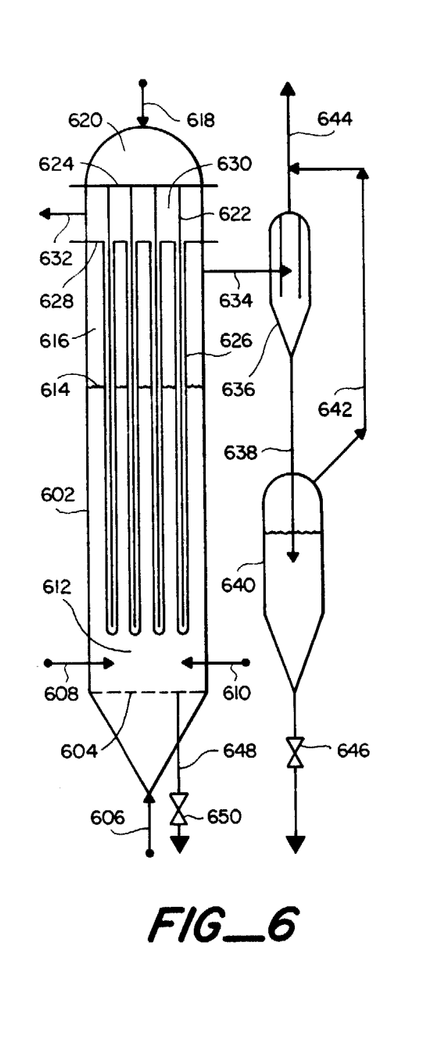
FIG. 6 is a schematic elevational diagram of an upflow fluidized bed reactor suitable for the process embodied in FIG. 5.
Figure 7:
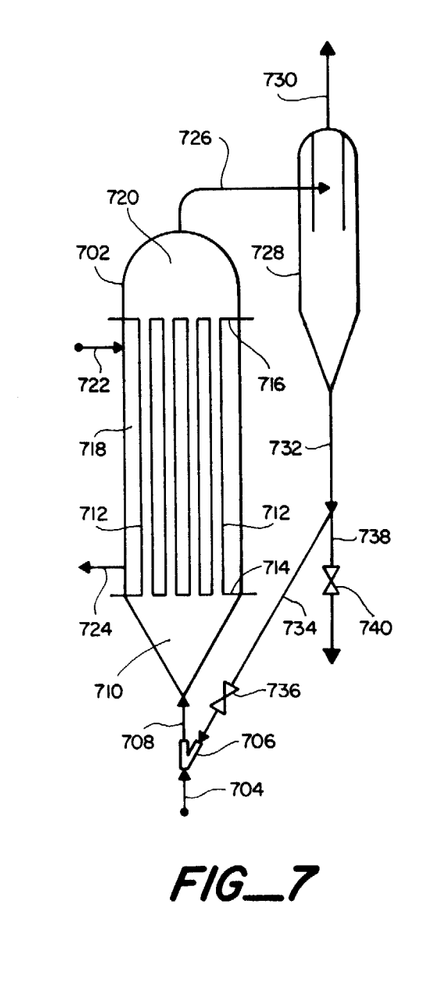
FIG. 7 is a schematic elevational diagram of an alternative upflow fluidized bed reactor illustrating external solids recirculation and suitable for the process embodied in FIG. 5.
Figure 8:
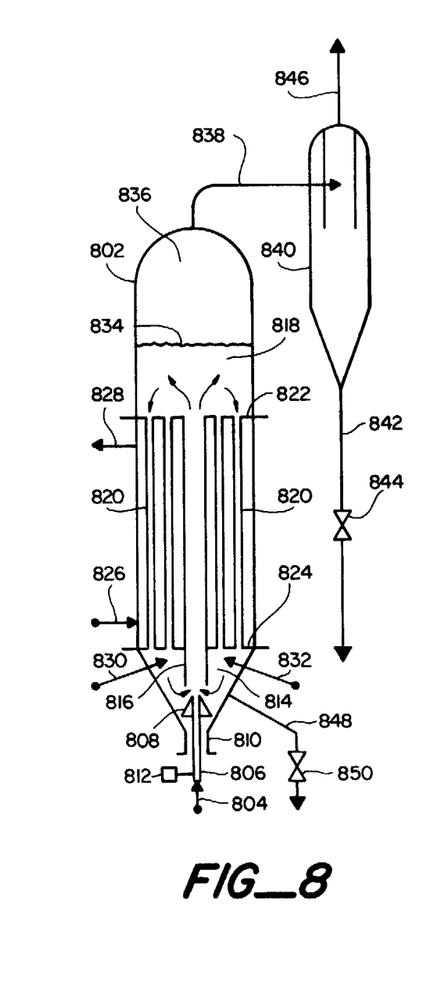
FIG. 8 is a schematic elevational diagram of a further alternative upflow fluidized bed reactor illustrating internal solids recirculation and suitable for the process embodied in FIG. 5.

The exchanger-cooled fluidized bed reactor of FIG. 5, in common with the uncooled reactor of FIG. 1, may be described as "downflow" in that net solids flow is downward, counter-current to the net upward gas flow. Other types of exchanger-cooled fluidized bed reactors may be used with the process of FIG. 5. FIGS. 6, 7 and 8 illustrate different versions of the "upflow" principle, in which the net flow of solids is upward, co-current to the net direction of gas flow.

FIG. 6 illustrates a fluidized bed reactor cooled by "bayonet" tubes and which disposes of spent solids production by entrainment. A cylindrical shell 602 contains an air distribution grid 604 at the bottom and provisions for charging air under the grid 604 through a connection 606. Fuel slurry, which may be diluted with recycled water or fines slurry, is injected above the grid 604 through one or more nozzles illustrated by connections 608 and 610. When there are several such nozzles some may be used to inject fuel slurry, or diluted fuel slurry, others recycled water or fines slurry.

A dense phase of solid particles 612, fluidized by upflowing air and water vapor, extends to an interface 614 above which the particle loading decreases substantially in what is referred to as a dilute phase region 616.

Cooling medium, such as saturated steam, enters by means of a connection 618, filling a plenum chamber 620 from which it is distributed among a number of parallel vertical "bayonet" tubes 622, extending through and supported by an upper tube sheet 624. The cooling steam flows downward through the bayonet tubes 622 which are within, and concentric with, an equal number of heat transfer tubes 626 of larger diameter which, in turn, extend through and are supported by a lower tube sheet 628. From the open lower ends of the bayonet tubes the steam reverses direction and flows upward through the annular spaces between the bayonet tubes 622 and the heat transfer tubes 626, the latter being immersed in, and distributed across the cross-section of, the dense fluidized bed 612. The heat transfer tubes 626 may have fins welded to their outer surfaces to increase the amount of surface exposed to the fluidized solids.

Because of the temperature difference existing between the hotter dense phase 612 and the cooler steam inside the heat transfer tubes 626, heat flows from the dense phase to the steam, superheating it. Upon reaching the upper ends of the heat transfer tubes 626 the superheated steam is collected in an open channel section 630 from which it leaves the reactor through a connection 632.

Most of the open space within the reactor shell 602 and between the air distribution grid 604 and the lower tube sheet 628 is occupied by the dense phase 612. The location of the interface 614 between the dense phase 612 and the dilute phase 616 is variable and depends upon operating parameters such as particle size and density and gas velocity. In practice, the interface 614 seeks a level such that the rate of entrainment of solid particles in the product gases exiting through a reactor overhead line 634 approximates the net production of product solids in the system.

A cyclone separator 636, designed to handle all of the spent solids rather than a small proportion of the lighter particles, as in the embodiments of FIGS. 2 and 3, separates out the preponderence of the solid material, which falls through a dipleg 638 into a spent solids hopper 640. In the hopper 640 some of the occluded gases disengage from entering solids and are vented through a vent line 642 to join with the main stream of product gases in an outlet connection 644.

Settled solids, somewhat compacted by the separation of vented gas, are withdrawn from the reaction system, either continuously or intermittently, through a powder control device 646 and may be disposed of through either a dry method, as in FIG. 5, or a wet method as in FIG. 1.

FIG. 7 illustrates a form of exchanger-cooled fluidized bed reactor in which external recirculation of fluidized solids is practiced. A cylindrical pressure shell 702 contains a bundle of vertical tubes open at both ends to the flow of fluidized solids, comprising the hot side of the exchange. A cooler heat transfer medium, such as steam being superheated, surrounds the tubes.

Fuel slurry, recycled water or fines slurry and compressed air enter via an inlet 704, which may be of concentric tube configuration as in the embodiment of FIG. 3, in which case the slurry input would be through an inner tube and air would enter through an annular space. In a special mixing fitting 706 the materials entering via the inlet 704 encounter a flow of hot recycled solid particles. The heat content of the recycled solids raises the temperature of the resulting mixture in a riser tube 708 above the critical temperature of the slurry water which, therefore, immediately ceases to be in liquid phase.

In an inlet cone 710, under conditions of turbulent mixing, comparatively high concentrations of fuel and oxygen, combustion proceeds at a rapid rate, increasing the temperature of the mixture as it rises to enter the open lower ends of a number of parallel vertical heat transfer tubes 712. The heat transfer tubes 712 extend through and are supported by a lower tube sheet 714 and an upper tube sheet 716 which also form a barrier between the reacting mixture below, in and above the tubes and a cooling medium in a space 718 surrounding the tubes 712.

Combustion continues as the reacting mixture rises through the tubes 712 and discharges into an open dense phase reaction space 720 above the upper tube sheet 716. Heat flows from the reacting mixture through the walls of the tubes 712 to the cooling medium in the surrounding space 718. The cooling medium, such as saturated steam, enters through a connection 722 and, increased in temperature by the heat transfer, leaves the reactor through a connection 724. It will be understood by those skilled in the heat transfer arts that the flow of coolant from the connection 722 through the surrounding space 718 to the outlet connection 724 is directed by appropriately placed baffles (not shown) so that all of the heat transfer tubes 712 are subjected to a uniform and efficient cooling effect.

Combustion taking place in the open space 720 essentially completes the consumption of oxygen. The fluidized mixture reaching the top of the open space 720 flows through a transfer line 726 to a cyclone separator 728, which performs a centrifugal separation between product gases, which leave the reaction system via an outlet connection 730, and powdered solids, which fall into a standpipe 732. The portion of the powdered solids to be recycled is diverted from the standpipe 732 into a recycle standpipe 734 from which they flow, by gravity, to a recycle powder control valve 736 which regulates the rate at which they are recycled to the mixing fitting 706. The net production of spent solids leaves the reaction system by means of a spent solids standpipe 738 and a spent solids control valve 740 and may be disposed of through either a dry method, as in FIG. 5, or a wet method as in FIG. 1.

FIG. 8 illustrates another form of exchange-cooled fluidized bed combustion reactor in which the recirculation of fluidized solids is internal to a cylindrical pressure shell 802. The embodiment of FIG. 8 combines the positive internal solids circulation of FIG. 3 with the fluidized solids-inside tubes cooling of FIG. 7.

Fuel slurry, which may be diluted with recycled water or fines slurry, and air enter the reaction system through an inlet 804 and a hollow valve stem 806, which may be of the concentric tube configuration of FIG. 3 in which case the slurry input would be through an inner tube and air would enter through an annular space. Attached to the upper end, and concentric with, the hollow valve stem 806 is a cone-shaped plug valve 808. The assembly comprising the plug valve 808 and the valve stem 806 may be moved in a vertical direction through a pressure seal 810 by means of a plug valve actuator 812. Raising and lowering the plug valve 808 has the effect of decreasing or increasing, respectively, the circular opening between a lower dense phase region 814 and an axial riser tube 816.

Slurry and air from the hollow valve stem 806 are projected upwards at moderately high velocity into the lower end of the riser tube 816. Because the pressure in the lower dense phase region 814 is slightly higher than that in the riser 816, hot settled solids flow through the circular opening between the plug valve 808 and the riser 816 and mix with the slurry and air entering from the hollow valve stem 806. The heat content of the recycled solids raises the temperature of the resulting mixture above the critical temperature of the slurry water which, therefore, ceases to be in liquid phase. Under the conditions of turbulent mixing, comparatively high concentrations of fuel and oxygen, combustion proceeds at a rapid rate during the upward passage in entrained phase through the riser 816.

The mixture leaving the top of the riser 816 enters a zone of substantially reduced velocity 818 which provides time for combustion to continue in dense phase and for product gases, now substantially depleted of oxygen, to be disengaged from the bulk of the fluidized solids. The larger proportion of particles entering the reduced velocity zone 818 eventually settle and flow downward as an internal solids recycle through a number of parallel heat transfer tubes 820 distributed throughout the annulus between the riser 816 and the pressure shell 802. The heat transfer tubes extend through and are supported by an upper tube sheet 822 and a lower tube sheet 824 which also form a barrier between the reacting mixture above, in and below the tubes and a cooling medium surrounding the tubes.

Combustion which occurs in the riser 816 and the reduced velocity zone 818 results in an increase in temperature, the fluidized solids in the zone 818 being hotter than those in the lower dense phase region 814. As the hot recycled solids move downward through the heat transfer tubes 820, heat flows through the tube walls to the cooling medium. The cooling medium, such as saturated steam, enters the space surrounding the tubes 820 through a connection 826 and, increased in temperature by the heat transfer, leaves the reactor through a connection 828. It will be understood by those skilled in the heat transfer arts that the flow of coolant from the connection 826 through the space surrounding the heat transfer tubes 820 to the outlet connection 828 is directed by appropriately placed baffles (not shown) so that all of the heat transfer tubes 820 are subjected to a uniform and efficient cooling effect.

The heat transfer through the tubes 820 simultaneously cools the settled solids flowing downward through them and into the lower dense phase region 814. They may be further cooled and diluted with water vapor by the injection of recycled hot water or fines slurry through nozzles illustrated by connections 830 and 832. From the region 814 the cooled recycled solids flow, as previously described, into the riser 816 at a rate controlled by the position of the plug valve 808. To increase the amount of heat transferred through the tubes 820 the valve 808 is lowered by the actuator 812. Conversely, to decrease the heat transfer the valve 808 is raised.

The location of an interface 834 between the dense phase in the reduced velocity zone 818 and a dilute phase 836 is variable and depends upon operating parameters such as particle size and density and gas velocity. In practice, the interface 834 seeks a level such that the rate of entrainment in the product gases exiting through a reactor overhead line 838 approximately equals the net production of solids in the system.

A cycline separator 840 employs centrifugal force to separate the preponderance of entrained solid material which falls into a standpipe 842 and leaves the reaction system through a powder control device 844 for disposal through a dry method, as in FIG. 5, or a wet method as in FIG. 1. Product gases, largely freed of entrained solid particles, leaves the top of the cyclone separator 840 via an outlet connection 846.

In the event there is an accumulation of particles too heavy to be entrained from the dense phase zone 818 it is possible to withdraw a small slipstream of fluidized solids from the lower dense phase region 814 through a purge standpipe 848 and a purge powder control device 850.

DESCRIPTION OF THE INVENTION

I have discovered that coal and other carbonaceous fuels can be burned cleanly and essentially completely in an alkalized fluidized bed, provided the pressure is higher and the temperature lower than conventionally employed and a relatively high concentration of water vapor maintained. Although useful heat may be extracted from the fluidized bed by heat exchange the primary control of combustion temperature is usually by injection of water. At the preferred pressure level essentially all of the water vapor in the combustion products can where so desired, be condensed at a useful temperature, the loss of latent heat being small. Because of the low combustion temperature, nitrogen oxides are not formed and sulfur is oxidized to sulfuric acid in which form it is removed by the alkali to a high degree of completeness. Dust may be scrubbed from the flue gas with hot water in the course of heat recovery.

For convenience in the description of the process of the invention I refer to carbonaceous fuels as coal. It is to be understood, however, that it applies similarly to any solid or semi-solid combustible material including, but not limited to, petroleum coke, char, lignite, peat, waste wood products, municipal refuse and fuels of vegetable or organic origin known collectively as "biomass". The process is advantageously applied to fuels normally associated with considerable water (peat, waste wood, garbage, bagasse, etc.) because water entering with the fuel usually leaves the apparatus as liquid water, rather than water vapor as in conventional combustion or incineration.

For convenience, I describe my process with reference to atmospheric air as the source of combustion oxygen. It is to be understood, however, that any oxygen-containing gas, such as commercial oxygen or enriched air, may be substituted for ordinary air.

In practicing the process of the invention coal is ordinarily received, stored, conveyed and crushed in ways familiar to industry. It may also be pulverized in grinding mills similar to those used for preparing fuel for conventional pulverized coal burners. However, since fuel is preferably charged as an aqueous slurry it is in many cases more convenient to employ some of the known wet grinding techniques, using water and/or recycled solution as the liquid medium. In circumstances such that coal can be transported to the site by slurry pipeline it needs little or no further preparation, avoiding the costly dewatering and drying necessary with conventional combustion methods.

Usually, recycled solution supplies most of the water needed to make up the fuel slurry. If not already present with the fuel, water is added as required to obtain a consistency which flows and pumps without difficulty. Make-up water does not usually require purification; in fact, it may sometimes utilize water unfit for other purposes. The minimum slurry water content depends upon physical properties of the fuel and may be as low as 40 weight percent. However, there is little economy in minimizing the slurry water and, ordinarily, 50 percent or more will be used.

Alkali is usually added to the fuel slurry as a combustion catalyst and to neutralize acids (principally sulfuric) formed during the combustion. However, the alkali need not necessarily be mixed with fuel slurry but may be separately charged to the fluidized bed. A few fuels, notably lignites, contain enough alkali that no addition is necessary. In most cases the most economical alkali is some form of pulverized limestone although dolomite and lime (calcined limestone) may also be used. Soda ash (sodium carbonate) is a very effective catalyst and neutralizing agent but is usually more expensive than limestone and is more prone to creating water pollution problems. In special cases, a mixture of alkalis, such as limestone and soda ash, may be advantageous. While not ordinarily required, combustion catalysts other than alkalis may also be added to the fuel slurry.

The alkalized fuel slurry is preferably pumped to the pressure of the reaction system by means of high pressure slurry pumps although other known methods of charging slurries to pressurized systems, such as blow cases, hydraulic displacement, etc., may be used. Operation of coal slurry pipelines is providing experience with large, high pressure slurry pumps.

Pressurized fuel slurry is preferably preheated by heat exchange before being charged to a fluidized bed combustion reactor. Although various alternative schemes for recovering heat need to be considered, it is generally logical to exchange heat between outgoing ash or fines slurry and incoming fuel slurry. This exchange is usually well balanced in quantity, pressure and temperature range. In most cases a double pipe type of heat exchanger is well suited to the service.

Although preheated by exchange as economically warranted, fuel slurry water remains largely or entirely in liquid phase up to the point of mixing with fluidized solids. The temperature of the fluidized solids is, however, above—and usually substantially above—the critical temperature of water (705.4° F.). If the pressure is below the critical (about 3200 psi) the water immediately vaporizes and is superheated to bed temperature. If pressure is above the critical, water technically passes into a state in which there is no distinction between liquid and vapor. However, even in the latter case, the transition occurs in the presence of air and flue gas with which it forms an intimate mixture having properties usual to the gaseous state. For convenience, therefore, I refer to water under these conditions as water vapor and the phase transition as vaporization. Properly fluidized beds of solids are characterized by turbulent mixing which, in my process, results in almost instantaneous vaporization of slurry water and dispersion of fuel particles among the solid particles comprising the bed.

When certain coals are heated they become plastic and sticky, often giving rise, in conventional processes, to fouling and blockage. In my process fuel is preheated in slurry form, each particle being insulated from its neighbors by a film of water or aqueous solution which prevents sticking or agglomerization. Although the liquid film disappears when the slurry is mixed with hot fluidized solids, fuel particles are simultaneously dispersed among a far greater number of non-sticky ash and alkali particles which largely determine bed characteristics.

Some fuels, particularly those of lower rank, do undergo a spontaneous molecular modification during the preheating, splitting off water and carbon dioxide and condensing to a more coal or coke-like structure, freeing water formerly not separable by mechanical means. This slurry phase "carbonization" can be useful by making possible separation of excess water, only the concentrated modified fuel slurry being charged to the combustion.

The gas supporting and agitating (fluidizing) the lower portion of a dense fluidized bed for my process is composed mainly of air (or other oxygen-containing gas) and water vapor. As the air rises through the bed its oxygen content is replaced by carbon dioxide and additional water vapor from combustion of the fuel so that the gas fluidizing the upper portion of the bed is largely a mixture of flue gas and water vapor. Because of the high gas densities, superficial velocities in my process tend to be on the low side of the reported range. In dense phase regions they will usually range from 1 to 5 feet per second, in risers or draft tubes 8 to 30 feet per second and in downcomer and standpipe regions 0 to 1 feet per second.

The combined effects of alkali, water vapor and pressure on combustion rate are so strong that some of the more reactive fuels can be burned at a bed temperature as low as 800° F. At the opposite extreme, temperatures can approach those employed in conventional fluidized bed combustion, about 1600° F. Generally, a combustion temperature in the range of 1000° to 1300° F. is preferred. Comparatively low temperatures limit the efficiency of use of product steam or energy whereas comparatively high temperatures require expensive materials of construction, increase equipment wear and tear, and may compromise the very high degree of sulfur removal and alkali utilization realized in the preferred range.

With embodiments such as FIG. 1 in which combustion temperature is controlled primarily by water injection, system pressure is determined mainly by the temperature at which the bulk of the product heat is required. Frequently, this translates into pressure of steam to be generated. For a large thermal power station, comparatively high pressure steam would normally be desired. In such case combustion pressure would usually be in the range of 3000 to 5000 pounds per square inch (psi) preferably 3500 to 4500 psi. In smaller installations, for which process heat or lower pressure steam is desired, combustion pressure may be as low as 1500 psi. Obviously, there are situations for which an optimum pressure would lie between these extremes. It is characteristic of such embodiments that combustion pressure must be substantially higher than product steam pressure.

With embodiments such as FIG. 5 in which combustion temperature is controlled primarily by heat exchange, the temperature of the heat so transferred (or pressure of steam so generated) is independent of system pressure which therefore may be determined by conventional process optimization, provided only that it be high enough to impose a water vapor pressure sufficient to adequately convert carbon and suppress sulfur dioxide at the chosen combustion temperature.

Although particle size and size range are important considerations in the proper operation of fluidized beds, considerable design variation is possible with appropriate adjustment of fluidizing gas velocity. Particles as large as one-fourth inch in diameter can be fluidized at sufficiently high gas velocity but considerably smaller particle sizes are preferred. Generally, the practicalities of fuel handling, particularly pumping the fuel slurry to combustion pressure, dictate a comparatively fine size range. Also, combustion rate, carbon clean-up and, in the case of limestone or dolomite, alkali utilization, are favored by decreasing particle size.

As combustible portions of the fuel are consumed, ash and spent alkali tend to accumulate. Particularly when lime, limestone or dolomite are charged, particles of alkali and spent alkali become substantial components of the bed solids. It is also within the scope of the invention to supplement the solids naturally accumulated with extraneous inert solid particles such as of sand. Although fuel slurry is continuously added, the relationship between combustion rate and bed volume is such that unburned fuel comprises only a minor proportion of the solids inventory.

Although the preponderance of combustion takes place in the dense phase bed (and risers, if employed), fine particles containing unburned carbon which are carried into the dilute phase above the dense phase continue to burn so long as they remain hot and in contact with oxygen.

Combustion of coal is highly exothermic. The heat evolved is usually in excess of that required to maintain the desired fluidized bed temperature, even with cooling surface in the bed (FIG. 5). Hot water, or hot fines slurry, is recycled from within the high pressure system to absorb this excess heat, thereby controlling the bed temperature. Secondary purposes of this "internal recycle" are to promote the combustion reactions so that essentially complete consumption of fuel is achieved with minimum excess air at a temperature lower than otherwise possible, to provide supplemental fluidizing vapor and to return fines (dust particles) transferred to aqueous phase condensed in downstream heat recovery equipment. Recycle water injected into a solids withdrawal zone or standpipe can also serve to displace fixed gases which would otherwise accompany the solid particles. Recycle water "vaporizes" in a fluidized bed in the same manner as fuel slurry water.

Internal recycle is an important aspect of the invention. Under the pressure employed, the recycled water vapor condenses in the heat recovery section (delivering its latent heat) at a temperature which, while necessarily below water's critical temperature, is high enough to be valuable. Thus combustion temperature is controlled without loss of thermal efficiency.

When, during the heat recovery process, water begins to condense from combustion products, it is contaminated with ash, alkali, spent alkali, coal salts, etc. However, as cooling continues, later portions of condensate (if kept separate from the initial portion) are distilled water virtually free of soluble or insoluble solids. In locations where pure water is scarce or expensive it may be worthwhile to arrange the cooling surface in sections so pure condensate can be segregated and produced, after recovery of sensible heat, as a valuable by-product. In such cases, poor quality water from outside the apparatus may partially, or entirely, substitute for internal recycle. It would be usual to preheat such water, as by exchange with the outgoing purified water.

In the embodiments of FIGS. 5-8, inclusive, part of the heat of combustion is transferred from the fluizided bed through heat exchange surface to steam. In similar fashion, heat may be transferred to air, boiling water, flue gas or any other fluid cooler than the fluidized bed.

As is known, heat transfer surface of various physical forms may perform essentially the same service. Although the embodiment of FIG. 5 is described with reference to "bayonet" style heat transfer tubes and those of FIGS. 7 and 8 with reference to fixed vertical heat transfer tubes with fluidized solids inside and cooling medium outside the tubes, it is to be understood that essentially the same general fluidized solids arrangements may be employed with other forms of heat transfer surface. Also, heat transfer surface may be immersed in the dense phase fluidized beds of reactors of the type illustrated in FIG. 2 and in the annular space and/or the dense phase zone of reactors as illustrated in FIG. 3.

The amount of heat transfer surface which can be usefully immersed in any fluidized bed is limited, in practice, by interference with the proper aeration and mixing (fluidization) of the bed particles. In my process it is further limited by the small bed volume, in comparison with the known fluidized bed combustions. These limitations can be overcome by cooling the fluidized bed by means of heat transfer surface external to the reactor, through which reactor solids are recirculated. The pressure differential necessary to establishing such a circulation may be obtained by maintaining a density difference (by suitable difference in aeration) between solids flowing downward in "settled phase" and solids returning upwards in a more expanded phase.

For any pressurized combustion to be efficient and economical it is a necessity that potential energy in the flue gas be utilized or recovered. In most modern pressurized combustion processes, as exemplified by jet engines, gas turbine engines and various combined cycle power systems, flue gas potential energy is recovered by expansion through turbines. Such power recovery has proven to be practical in the case of ash-free fuels, such as gas and petroleum liquids. The ash in coal and most other solid fuels create operating and maintenance problems by eroding and fouling the essential, but delicate, turbines. Conventional combustions are, by their very nature, dry systems. In spite of the expediture of a great deal of effort, a completely satisfactory dry method of removing fine ash and other particles from hot flue gases has not been found.

In the several embodiments illustrated, a single-stage cyclone separator has been shown as the means of limiting carryover of dust in gases leaving reaction systems whereas, in other pressurized fluidized bed combustion processes, up to 3 stages of cyclones, or other elaborate cleaning, is employed. The novel conditions of my process permit scrubbing the flue gas with hot water, freeing it completely from erosive dust. A single stage of cyclones in a convenience, retaining most of the solids in the reaction system and minimizing erosion and fouling of pipes and heat exchangers between the reactor and the wet scrubbing equipment. However, even the single stage cyclone is not absolutely essential and may, in some cases, be omitted.

For convenience in discussing heat recovery and phase separation, I shall refer to heat at a temperature sufficient to generate product steam as "high level heat". High level heat in product gases from the reaction system may be utilized in several ways. A primary use will usually be to generate and superheat steam and this steam may also be reheated after the primary stage of expansion in an associated turbogenerator installation. It is also usually advantageous to employ some of the high level heat to reheat flue gas before utilization or expansion. Other uses include supplying reaction heat to endothermic chemical reactions and, in general, to any industrial process or material requiring heat in the range of 500° to 1100° F.

As combustion products are cooled, in the course of recovering high level heat, the dewpoint is reached and water vapor begins to condense to liquid water. A difficulty is sometimes encountered, when cooling dust-containing gases, with plugging of equipment in the vicinity of the dewpoint. This is because, for a short distance of travel, liquid droplets attract solid particles and form a non-fluid mixture. Passages may become obstructed with material best described as "mud". Should this difficulty arise, in apparatus for the process of my invention, it may be overcome by injecting hot water, or fluid slurry, as from the discharge of the circulating reflux pump or the fines slurry recycle pump of FIG. 1, at a point upstream of the condition.

Combustion heat remaining in the flue gas and ash slurry, after maximum economic recovery of high level heat, may be subject to further recovery by transfer to relatively cold incoming streams, such as fuel slurry and boiler feedwater. It will be apparent to those skilled in the art that numerous alternative arrangements for recovering this low level heat may be used, depending upon such local circumstances as the temperature at which boiler feedwater is returned to the apparatus. When the invention is utilized to supply power and heat for process purposes there are frequently opportunities to transfer part of the low level heat to cooler fluids in the associated process plant.

Although conventional heat exchangers may be used for recovering low level heat from flue gas, the method I have chosen to illustrate comprises direct contact with recirculating hot water, which subsequently transfers this heat indirectly to dried flue gas and boiler feedwater. The circulating water also scrubs the flue gas clean of dust particles before power recover or utilization. I consider this effective cleansing an important advantage when compared with less effective dry methods when conventional fluidized combustion processes have to use. While ordinary vapor-liquid contacting elements, such as bubble or perforated trays, are generally adequate for the purpose, it is entirely feasible to substitute special gas scrubbing trays or other gas washing devices for some or all of the contacting elements.

The embodiments of FIGS. 1 and 5 illustrate the compression of air by means of three separate compressors, or stages, arranged in series. In certain cases, particularly when unit capacity is small and/or operating pressure comparatively low, it may be preferable to use fewer stages of compression. In other cases, particularly when unit capacity is large and/or operating pressure comparatively high, it may be advantageous to compress the air in four stages. Except when delivering it at system pressure, it is generally logical, but not obligatory, to expand the flue gas in the same number of stages as employed for air compression, with the low pressure (first) stage of compression coupled with the low pressure (last) stage of expansion, intermediate pressure compression with intermediate pressure expansion, and the high pressure (last) stage of compression with the high pressure (first) stage of expansion.

While only a single train of turbo-compressors is illustrated, it will be apparent that, for very large units, it may be advantageous or necessary to use two or more trains of turbo-compressors in parallel. Another mechanical alternative applicable to large units, for which shaft diameter may be limiting, is to couple parallel turbines to both ends of the compressor shafts. There would then be, practically speaking, twice as many trains of turbines as of compressors.

Flue gas may be heated and reheated before expansion to a greater or lesser degree. An obvious case is to heat and reheat only to a temperature such that the turbines yield exactly as much power as needed by the compressors. (Energy so employed is not actually consumed but recycles back into the process in the form of air preheat and feedwater preheat in compressor intercoolers.) This case maximizes exportable heat, such as superheated steam. In the embodiments of FIGS. 1 and 5 turbine inlet temperatures are high enough to yield excess power for electricity generation. It will be apparent that numerous turbine-compressor-generator combinations are possible. For example, when using comparatively high turbine inlet temperature, compression and expansion ratios may be so specified that all but one of the turbo-compressor sets are in power balance, all of the excess power being available at a single stage. The compressor for this stage and the generator would probably be driven by separate, parallel turbines.

It is also possible to specify turbine inlet temperatures and expansion ratios so that the discharge temperature of the last stage of expansion is so low that the economizer exchanger, shown in FIGS. 1 and 5, would be omitted. This temperature could even be as low as ambient if that were permissible, eliminating loss of heat in flue gas.

Potential energy in the unexpanded flue gas may also be utilized by injecting it into underground oil-bearing formations, to assist in causing residual oil to flow to a producing well. As is known, the carbon dioxide normally present in flue gas tends, under pressure, to dissolve in crude oils, increasing their fluidity. This effect may be intensified by substituting oxygen for air in carrying out the combustion process of my invention, resulting in a flue gas predominently composed of carbon dioxide. It may also be useful to reheat the flue gas or carbon dioxide, by exchange with hot combustion products, so as to apply heat as well as pressure to the formation. A further alternative is to inject hot combustion products, comprising a flue gas-steam or carbon dioxide-steam mixture, after only conventional dry dust removal. A further alternative is to deliver for injection flue gas or carbon-dioxide-steam mixtures which have been cooled below their dewpoints and wet scrubbed free of solid particles, with or without reheating.

From the standpoints of simplicity, ease of operation and equipment economy, a wet ash removal method, as in the embodiment of FIG. 1, is preferable. However, the wet ash-spent alkali mixture may present a disposal problem, especially when the sulfur content of the fuel is comparatively high and/or the ash comparatively low. In such cases a dry system, as in the embodiment of FIG. 5, may be used it being understood that there is extensive art applicable to the details of apparatus and operation of both continuous and intermittent methods of withdrawing powdered solids from pressurized systems.

When a wet system is employed the net production of ash slurry is subjected to heat recovery and then separated further into wet ash, for disposition external to the apparatus, and a clarified solution. Although a gravity settler is illustrated in FIG. 1 as the solid-liquid separating device, other types of such devices known to the art, for example, filters or centrifuges, may be used.

What I have called wet ash will, in most cases, be mixed with limestone and calcium sulfate (gypsum). While the latter is more-or-less the equivalent of the scrubber sludge which would have been produced in a conventional flue gas scrubber, the fully oxidized sulfate is more easily dewatered and structurally stabile. The presence of ash further stabilizes the gypsum, resulting in a wet solids disposal situation less unfavorable than with conventional sulfur dioxide scrubbing.

All of the solution separated from the ash may be discarded. However, part is normally recycled to the fuel slurrying system (external recycle) and part purged from the system. The purpose of the purge is to reject essentially all soluble impurities from the system. A purpose of the external recycle is to build up the concentration of the soluble impurities so that a relatively small volume of purge suffices to remove them at an equilibrium rate. When a soluble alkali is being added to the fuel slurry, external recycling also conserves alkali and, in some cases, salts extracted from the ash have a combustion-promoting effect, lessening the need for alkali in excess of the sulfur equivalent.

When soda ash is the alkali added to the fuel slurry, sodium sulfate formed from fuel sulfur is water soluble and is purged, along with soluble constituents of the ash, from the clarified solution. Water soluble salts may present a disposal problem and therefore may be treated with lime or limestone externally to the apparatus to convert them into comparatively insoluble calcium salts, regenerating the soda ash solution for re-use. This treatment uses technology known to so-called "double alkali" processes for scrubbing conventional flue gases.

When spent solids are withdrawn from the apparatus in dry form it is nevertheless necessary, except when intentionally delivering a steam-fine gas mixture, to withdraw a net surplus of water or fines slurry from the pressurized section of the apparatus to maintain a water balance. In most cases, the heat in this hot water or slurry would be recovered by heat exchange, as with fuel slurry, or by flashing to produce intermediate and-/or low pressure steam useful for auxiliary purposes such as feedwater treating. Except for a light loading of essentially insoluble dust, this water is much less contaminated than solution separated from wet ash and is usually suitable for reuse in the fuel slurrying system without the necessity for purge. Depending upon water balance of the particular case, however, there may be an excess above fuel slurry requirements.

Although, in the preferred embodiments, combustion takes place in a fluidized bed containing alkali or alkalized particles, it is also possible, especially with comparatively reactive fuels, to omit the alkali addition. In some cases the fuel, itself, contains sufficient alkali to neutralize all acids formed. In others, the oxidation products of sulfur, mainly sulfuric acid vapor and sulfur trioxide, may be allowed to leave the reactor with the other gaseous products, in which case alkali to neutralize and remove them from the flue gas will usually be added to the water (circulating reflux) which cools and scrubs the gas after separation of ash slurry.

It has been noted in the descriptions of the embodiments that letting down an ash slurry from around the pressure of the fluidized bed to near atmospheric is a severe service for the throttling device. In some cases it may be too severe for any such devices commercially available. For these cases it is possible to design and fabricate a novel throttling device using the principle of the pinch valve, employed at lower pressure levels to control the flow or pressure of corrosive and/or abrasive fluids. A flexible inner tube fabricated from abrasion-resistant elastomer material, such as silicone rubber or Teflon, would be placed inside and concentric with a heavy walled metal cylinder, capable of withstanding pressures in excess of system pressure. A source of fluid pressure, such as a hydraulic pump or accumulator, would be connected with the annulus between the flexible tube and the cylinder, through a regulating device responsive to the difference between the pressure of the slurry and the pressure in the annulus.

To decrease the flow of slurry through the throttling device, the differential pressure would be increased, compressing the middle part of the flexible tube to a smaller average diameter. Conversely, to increase the flow, the differential pressure would be decreased, permitting the flexible tube to expand toward its uncompressed diameter. In effect, the flexible tube would be manipulated to comprise a venturi of variable geometry.

Although the flexible tube would be inadequate, by itself, to withstand system pressure, pressure in the annulus would be regulated at all times so that the flexible tube is exposed only to a differential pressure well within its stress capabilities.

A practical apparatus for the practice of the invention has to give consideration to methods for starting up the turbo-compressors. It is characteristic of these machines that they do not deliver rated pressure at reduced capacity or power. One method of obtaining start-up power temporarily is to provide each set with a crossover connection between compressor discharge and turbine inlet, containing an oil-fired combustion chamber, similar to those used with gas turbine prime movers. The first stage compressor set would also have a starter motor or turbine. To initiate start-up, this compressor would be rotated by its starter motor or turbine to sufficient speed to produce air flow through its crossover, combustion chamber and turbine. Fuel would then be fired in its combustion chamber, raising the temperature of the flowing air enough to obtain a slight excess of power from the turbine. When the first compressor reached a suitable speed, air would be bled from its discharge through the second stage compressor, its combustion chamber and turbine, fuel would be fired in the second stage combustion chamber and so on until all turbo-compressors were operating at a speed able to create sufficient air pressure (usually less than normal operating pressure) to initiate combustion in the fluidized bed.

It is also necessary to preheat the fluidized bed before charging fuel slurry. This may be accomplished at comparatively low pressure with an oil or gas fired air heater, or hot flue gas from any convenient source.

Having described my invention I claim:

1. A continuous pressurized fluidized bed combustion process comprising charging an aqueous slurry of solid fuel particles and alkali in an amount at least the chemical equivalent of the sulfur content of the fuel as alkali sulfate, to a combustion zone comprising a bed of solid particles; fluidizing the bed with an upward velocity between 1 and 10 feet per second of a gas containing oxygen and at least 3 atmospheres partial pressure of water vapor measured at the outlet of the zone; maintaining the combustion zone at a temperature between 710 and 1600 degrees Fahrenheit; withdrawing gaseous products containing entrained solid matter from above the zone; cooling the gaseous products below their dewpoint at essentially combustion pressure by the indirect transfer of useful heat; and separating from uncondensed gaseous products an aqueous condensate carrying essentially all of the entrained solid matter.

2. A process as in claim 1 in which the fluidized bed is comprised in part of inert particles other than ash, alkali and spent alkali.

3. A process as in claim 1 and comprising the additional step of passing the gaseous products containing entrained solid matter through a gas-solids separating device forming a powdered dry ash and cleaned gaseous products containing fine dust; cooling the cleaned gaseous producte below their dewpoint at essentially combustion pressure by the indirect transfer of useful heat; and separating from the uncondensed gaseous products an aqueous condensate carrying essentially all of the fine dust.

4. A process as in claim 3 in which the powdered dry ash is removed from the apparatus as a product.

5. A process as in claim 3 and comprising the additional step of mixing at least part of the aqueous condensate with the powdered dry ash at essentially combustion pressure to form an ash slurry.

6. A process as in claim 3 and comprising the additional step of further cooling the uncondensed gaseous products by the indirect transfer of useful heat, forming a wet flue gas and a second aqueous condensate essentially free of solid matter.

7. A process as in claim 3 and comprising the additional step of returning at least a portion of the aqueous condensate carrying fine dust to the fluidized bed.

8. A process as in claim 3 in which the temperature of the fluidized bed is regulated by means of the injection of water thereinto.

9. A process as in claim 3 in which the temperature of the fluidized bed is regulated by means of the indirect transfer therefrom of useful heat.

10. A process as in claim 3 and comprising the additional step of returning the powdered dry ash to the fluidized bed.

11. A process as in claim 10 and comprising the additional step of maintaining the inventory of solid particles in the fluidized bed essentially constant by withdrawing therefrom a portion of its contents as a dry solids product.

12. A process as in claim 3 and comprising the additional step of washing the uncondensed gaseous products by direct contact with water.

13. A process as in claim 12 and comprising the additional step of reheating the washed uncondensed gaseous products by indirect exchange with the cleaned gaseous products.

14. A process as in claim 12 in which the water used to wash the uncondensed gaseous products is cooled by the indirect transfer therefrom of useful heat so that, when recirculated to the washing step, it is capable of cooling the uncondensed gaseous products to a temperature at which their water vapor content is less than 12 volume percent, forming a dried flue gas.

15. A process as in claim 14 and comprising the recovery of potential energy in the dried flue gas by the additional steps of reheating the dried flue gas by indirect exchange with the cleaned gaseous products and expanding the heated flue gas through a gas turbine, one or more times, the reheat temperature being sufficiently high as to cause the turbines to yield at least as much mechanical energy as required to deliver the oxygen-containing gas to the lower part of the fluidized bed.

16. A process as in claim 12 and comprising the additional step of adding alkali to the recirculating stream of water.

* * * * *